US007054381B2

United States Patent
Lim et al.

(10) Patent No.: US 7,054,381 B2
(45) Date of Patent: May 30, 2006

(54) APPARATUS FOR TFCI MAPPING IN WIRELESS COMMUNICATION MOBILE STATION AND METHOD THEREOF

(75) Inventors: In Gi Lim, Taejon (KR); Hyung-Il Park, Taejon (KR); Kyung Soo Kim, Taejon (KR); Han Jin Cho, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 646 days.

(21) Appl. No.: 09/983,118

(22) Filed: Oct. 23, 2001

(65) Prior Publication Data
US 2003/0026350 A1    Feb. 6, 2003

(30) Foreign Application Priority Data
Jul. 30, 2001    (KR) ................. 2001-46061

(51) Int. Cl.
H04L 27/04  (2006.01)
H04L 27/12  (2006.01)
H04L 27/20  (2006.01)
H04Q 7/20   (2006.01)

(52) U.S. Cl. .................. 375/295; 455/422.1

(58) Field of Classification Search ............ 375/295, 375/377; 455/422.1, 466, 522; 370/342

See application file for complete search history.

(56) References Cited

U.S. PATENT DOCUMENTS

| | | | |
|---|---|---|---|
| 5,917,852 A * | 6/1999 | Butterfield et al. | 375/141 |
| 6,341,125 B1 * | 1/2002 | Hong et al. | 370/335 |
| 6,781,970 B1 * | 8/2004 | Ovesjo et al. | 370/328 |
| 6,804,264 B1 * | 10/2004 | Song | 370/500 |
| 6,804,314 B1 * | 10/2004 | Kobori | 375/354 |
| 6,807,235 B1 * | 10/2004 | Yano et al. | 375/259 |
| 6,810,019 B1 * | 10/2004 | Steudle | 370/252 |
| 6,813,506 B1 * | 11/2004 | Song | 455/466 |
| 6,868,075 B1 * | 3/2005 | Narvinger et al. | 455/422.1 |

FOREIGN PATENT DOCUMENTS

| | | |
|---|---|---|
| KR | 2000-38863 | 7/2000 |
| KR | 2000-71672 | 11/2000 |
| KR | 2001-15268 | 2/2001 |
| KR | 1020020007714 | 1/2002 |

OTHER PUBLICATIONS

TSGR1#20(01)0530, TSG RAN WG1 Meeting #20, May 2001.*

* cited by examiner

*Primary Examiner*—Betsy L. Deppe
(74) *Attorney, Agent, or Firm*—Mayer, Brown, Rowe & Maw LLP

(57) ABSTRACT

In an apparatus for a TFCI mapping in a wireless communication mobile station, and a method thereof, the apparatus includes an encoding unit for encoding a TFCI transmitted from a main control unit as a CPU; a TFCI mapping unit for generating necessary control parameter and a TFCI code by using a signal encoded by the encoding unit and a signal transmitted from the CPU; and a CPU for controlling the encoding unit and the mapping unit.

8 Claims, 8 Drawing Sheets

APPARATUS FOR TFCI MAPPING IN WIRELESS COMMUNICATION MOBILE STATION AND METHOD THEREOF

FIELD OF THE INVENTION

The present invention relates to an apparatus for a TFCI (Transport Format Combination Indicator; Hereinafter, referred to as 'TFCI') mapping in a wireless communication mobile station and a method thereof; and more particularly, to an apparatus for a TFCI mapping in a wireless communication mobile station and a method thereof, which is embodied within a modulator of a mobile station in an IMT-2000 asynchronous system etc.

PRIOR ART OF THE INVENTION

In general, in a transmission of a TFCI as a modulator of an IMT-2000 asynchronous system mobile station, it is largely constructed by a TFCI encoder and a TFCI mapper.

A TFCI code indicates data gained by receiving a TFCI from a central processing unit (hereinafter, referred to as 'CPU') and by encoding it with a reed-muller code. The TFCI serves as a role of informing a transmission channel of information which is concerned with a combination of multiplexed several transport channels, namely, a role of informing a receiving end of the data number of a spreading factor (SF) and each transport channel.

The TFCI code is used in case that several services such as a voice service, an image service and a character service etc. are supported simultaneously, and since the TFCI code is transmitted every frame, the CPU inputs the TFCI every frame.

A TFCI transmission is essentially required in a mobile station of the IMT-2000 asynchronous system. In a 3GPP (3$^{rd}$ Generation Partnership Project) standard which is concerned with the TFCI transmission, the TFCI encoder receives 10 bit, and encodes it into a reed-muller code, to thus gain 32 bit. In case that the input bit is below 10 bits, '0' is made from a most significant bit to 10 bit.

The TFCI mapper is the equipment for performing a puncturing or a repetition etc. for a TFCI encoder output according to a non compressed mode and a compressed mode, and outputting it complying with a TFCI transmission section provided within a slot. In a case of the non compressed mode, the TFCI mapper does not transmit the TFCI or punctures 31th and 32th bits to thus allocate respectively by 2 bit to every slot and transmit it.

In a case of the compressed mode, 30 bit is transmitted like the non compressed mode, or the total of 32 bit is transmitted. In a case of more than 32 bit (maximum 42 bit) per frame, it is filled with 32 bit, and then, the rest is filled in an opposite order by selecting the preceding transmitted TFCI bits on the basis of a TFCI mapping algorithm.

FIG. 1 is a frame structure diagram in the standard of the IMT-2000 asynchronous mobile station in accordance with the present invention, and 1 frame (10 msec) is constructed with 15 slots, and transmission data is constructed by a data channel 110 and a control channel 120. The control channel 120 is composed of a pilot, a TFCI, a FBI (FeedBack Information), and a TPC (Transmit Power Control), and has individually different data bit compositions according to a slot format. A TG Transmission Gap) as a section not transmitted in the compressed mode is constructed by a unit of a slot, and the TG can be provided by up to the maximum 7 slots within one frame.

Parameter for the TFCI transmission represented in the conventional 3GPP standard can be arranged as the following [Table 1].

TABLE 1

| mode | TGLENGTH | Number of transmission slots | TFCI bit number per slot ($N_{TFCI}$) | TFCI bit number per frame (D) | Repeated bit number ($N_{RPT}$) | Repeated bits |
| --- | --- | --- | --- | --- | --- | --- |
| Non-compressed mode | 0 | 15 | 0 | 0 | 0 | None |
|  | 0 | 15 | 2 | 30 | 0 | None (2 bit puncture) |
| Compressed mode | 1 | 14 | 3 | 42 | 10 | $B_{E+9}, B_{E+8}, \ldots B_{E+1}, B_E$ |
|  | 2 | 13 | 3 | 39 | 7 | $B_{E+6}, B_{E+5}, \ldots B_{E+1}, B_E$ |
|  | 3 | 12 | 3 | 36 | 4 | $B_{E+3}, B_{E+2}, B_{E+1}, B_E$ |
|  | 4 | 11 | 3 | 33 | 1 | $B_E$ |
|  | 5 | 10 | 3 | 30 | 0 | None (2 bit puncture) |
|  | 6 | 9 | 4 | 36 | 4 | $B_{E+3}, B_{E+2}, B_{E+1}, B_E$ |
|  | 7 | 8 | 4 | 32 | 0 | None (All transmission) |

In a case of the non compressed mode, a length of the TG (hereinafter, referred to as 'TGLENGTH') is 0, and all of 15 slots are transmitted. At this time, the bit number of the TFCI transmitted per slot is decided by a format of the slot, and can have the value of 0 and 2. Thus, in case that the bit number of the TFCI transmitted per slot is 0, the TFCI is not transmitted, and in a case of 2, D as the TFCI bit number per frame becomes 30, and the last $B_{30}$ and $B_{31}$ bits among the TFCI codes of inputted 32 bit are punctured, thus the transmission is not performed.

In a case of the compressed mode, TGLENGTH is from 1 to 7, and according to that, the slot number transmitted per frame is decided from 14 to 8. In case that TGLENGTH is 1, the TFCI number per slot (hereinafter, referred to as '$N_{TFCI}$') is 3, and the TFCI number per frame (hereinafter, referred to as 'D') becomes 42. Therefore, in this case, 10 bit of $B_{E+9}, B_{E+8}, \ldots, B_{E+1}, B_E$ is repeatedly transmitted. At this time, a value of E is decided by the TFCI mapping algorithm. In checking [Table 1] by the same method, in case that TGLENGTH is 1, 2, 3, 4 and 6, the bit number to be repeated ($N_{RPT}$) is decided as 10, 7, 4, 1 and 4. In case that TGLENGTH is 5, 2 bit is punctured like the non compressed mode, and in a case of 7, all of the TFCI codes of 32 bit are transmitted.

The TFCI mapping algorithm in the compressed mode is as follows.

A radical letter E of the last bit to be repeated is equal to the rest which is gotten by dividing a multiplication of a first slot value of the TG (hereinafter, referred to as '$N_{FIRST}$') and $N_{TFCI}$ by 32. In other words, it can be represented as the following Equation (1).

$$E = (N_{TFCI} \times N_{FIRST}) \bmod 32 \quad \text{Eq. (1)}$$

$B_k$ as a coded bit is mapped with $d_k$ as a TFCI bit according to the following relation. When D as the TFCI bit number transmitted per frame is smaller than 32 or equal to 32, the mapping is gained by the following Equation (2).

$$d_k = B_k \bmod 32, k=0, 1, 2, \ldots, \min(31, D-1) \quad \text{Eq. (2)}$$

Further, when D is greater than 32, 32 bit from $B_0$ to $B_{31}$ is mapped by the above Equation (2), and an output corresponding to an extent of the $N_{RPT}$ number to be repeated and transmitted is mapped by the following Equation (3).

$$d_{D-k-1} = B_{(E+k) \bmod 32}, k=0, 1, 2, \ldots, D-33 \quad \text{Eq. (3)}$$

Like the above, in the TFCI transmission provided under the non compressed mode, it is not transmitted at all or 2 bit is punctured and transmitted, and also, under the compressed mode, in case that D is 32, all are transmitted, and in a case of 30 bit, 2 bit is punctured and transmitted. In case that $N_{RPT}$ is 1, 4, 7 and 10, it is repeated by the repetitive bit number calculated by the TFCI mapping algorithm among the transmitted TFCI bits and then the transmission is gained.

The TFCI mapping technique above-mentioned is an essential technical element required for the embodiment of IMT-2000, and such technique is being actively introduced in the current mobile communication technical field.

SUMMARY OF THE INVENTION

Therefore, it is an object of the present invention to provide an apparatus for a TFCI mapping in a wireless communication mobile station, which is capable of effectively transmitting a TFCI bit by embodying a TFCI mapping algorithm based on a non compressed mode and a compressed mode with a simplified hardware.

Another object of the present invention is to provide a method for a TFCI mapping in a wireless communication mobile station, in which a TFCI bit can be effectively transmitted by embodying a TFCI mapping algorithm based on a non compressed mode and a compressed mode with a simplified hardware.

A still another object of the present invention is to provide a record medium which is capable of being read through a computer which has a recording of a program to realize a function of effectively transmitting a TFCI bit by embodying a TFCI mapping algorithm based on a non compressed mode and a compressed mode with a simplified hardware.

In accordance with an aspect of the present invention, there is provided an apparatus for a TFCI mapping in a wireless communication mobile station including: an encoding unit for encoding a TFCI which is transmitted from a main control unit as a CPU; a TFCI mapping unit for generating a necessary control parameter and a TFCI code by using a signal encoded by the encoding unit and a signal transmitted from the CPU; and a CPU for controlling the encoding unit and the mapping unit.

In accordance with an aspect of the present invention, there is provided a method for a TFCI mapping in a wireless communication mobile station, including the steps of: a) encoding a TFCI transmitted from a main control unit as a CPU to generate an encoded signal; b) generating control parameters by using the encoded signal, a signal transmitted from the CPU and a signal transmitted from a mobile station; c) generating a TFCI code bit repetitive pattern to generate a TFCI code; and d) transmitting data according to a mapped code.

In accordance with an aspect of the present invention, there is provided a computer readable record medium storing of a program, in a TFCI mapping apparatus which has a microprocessor, for executing a method for a TFCI mapping in a wireless communication mobile station, the method including the steps of: a) encoding a TFCI transmitted from a main control unit as a CPU to generate an encoded signal; b) generating control parameters by using the encoded signal, a signal transmitted from the CPU and a signal transmitted from a mobile station; c) clarifying whether or not a TFCI transmission is a non-compressed mode, generating a TFCI code by puncturing data in a case of the non compressed mode, generating a TFCI code bit repetitive pattern in a case of a compressed mode to generate the TFCI code; and d) transmitting data according to a mapped code.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Hereinafter, preferred embodiments of the present invention will be described in detail with reference to the accompanying drawings.

In accordance with the present invention, a compressed mode for a TFCI transmission is described as follows.

Figure 1:
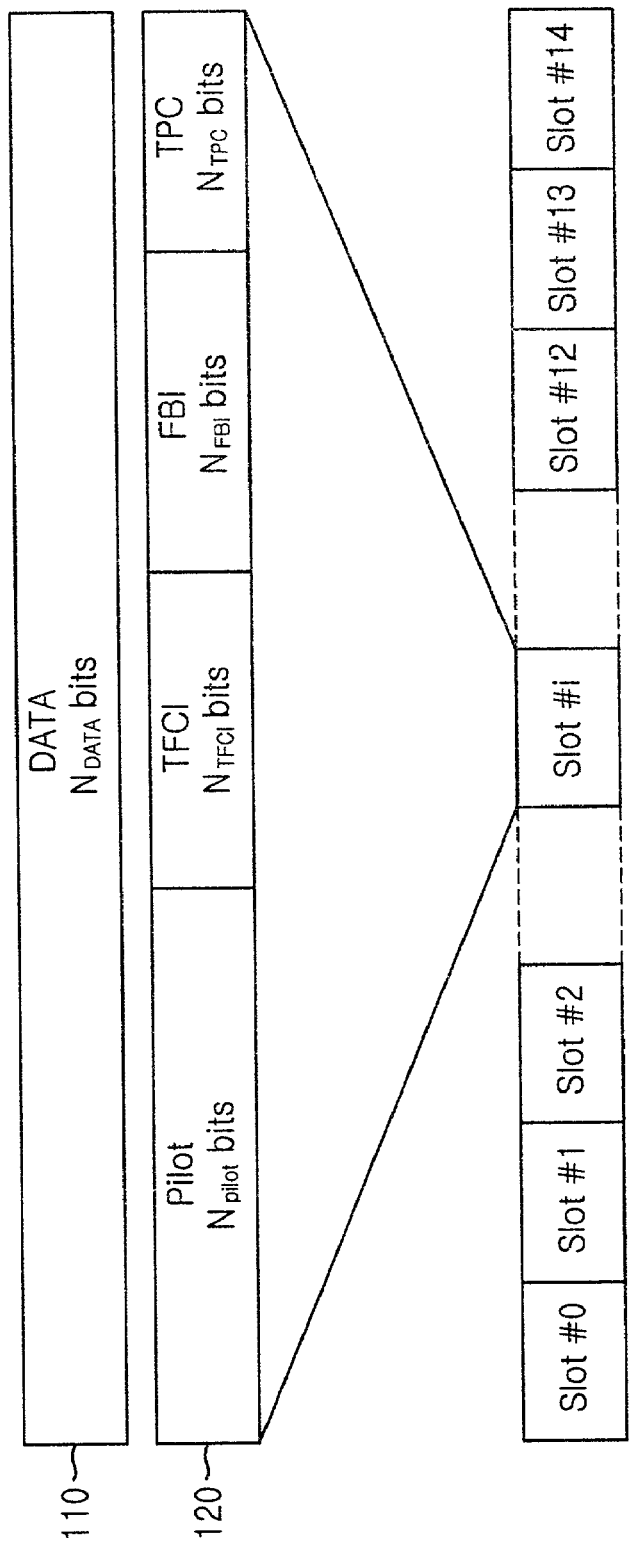
FIG. 1 represents a frame structure diagram in the standard of an IMT-2000 asynchronous mobile station in accordance with the present invention.
Figure 2:
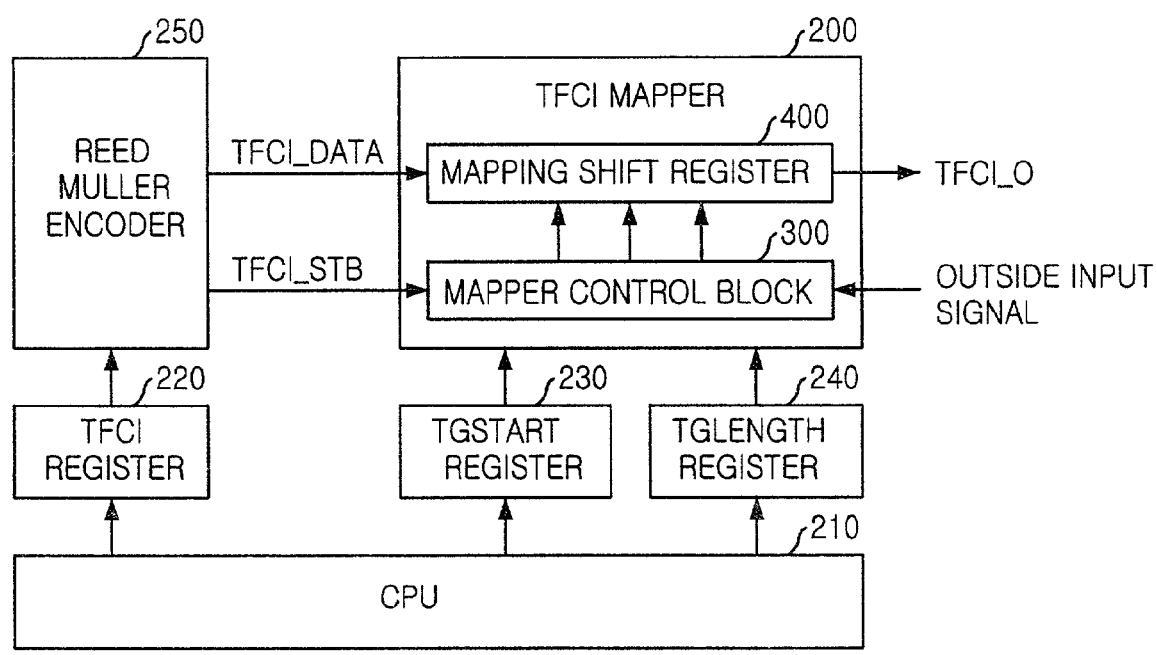
FIG. 2 depicts a structure diagram in one embodiment of a TFCI mapping apparatus in accordance with the present invention.

FIG. 2 is a structure diagram in one embodiment of a TFCI mapping apparatus in accordance with the present invention.

As shown in the drawing, an inventive apparatus for a TFCI mapping includes a TFCI mapper 200, a CPU 210, a TFCI register 220, a TGSTART register 230, a TGLENGTH register 240 and a reed muller encoder 250. Further, the TFCI mapper 200 contains a mapping shift register 400 and a mapper control block 300.

The reed muller encoder 250 performs a function of encoding 10 bit TFCI which is transmitted every frame from the CPU 210 through the TFCI register 220, by a reed muller code, and of generating 32 bit TFCI code.

The mapper control block 300 performs a function of generating a necessary control parameter by using a value of a TG start slot (hereinafter, referred to as 'TGSTART') inputted from the CPU 210 through the TGSTART register 230, and input signals of a frame boundary signal, a TFCI transmission section signal and a TFCI transmission frequency signal etc. which are received from a mobile station.

Further, the mapping shift register 400 performs a function of receiving a control of control parameter generated by the mapper control block 300, generating a puncture under the non compressed mode and a TFCI code bit repetitive pattern under the compressed mode, and gaining the TFCI mapping.

Figure 3:
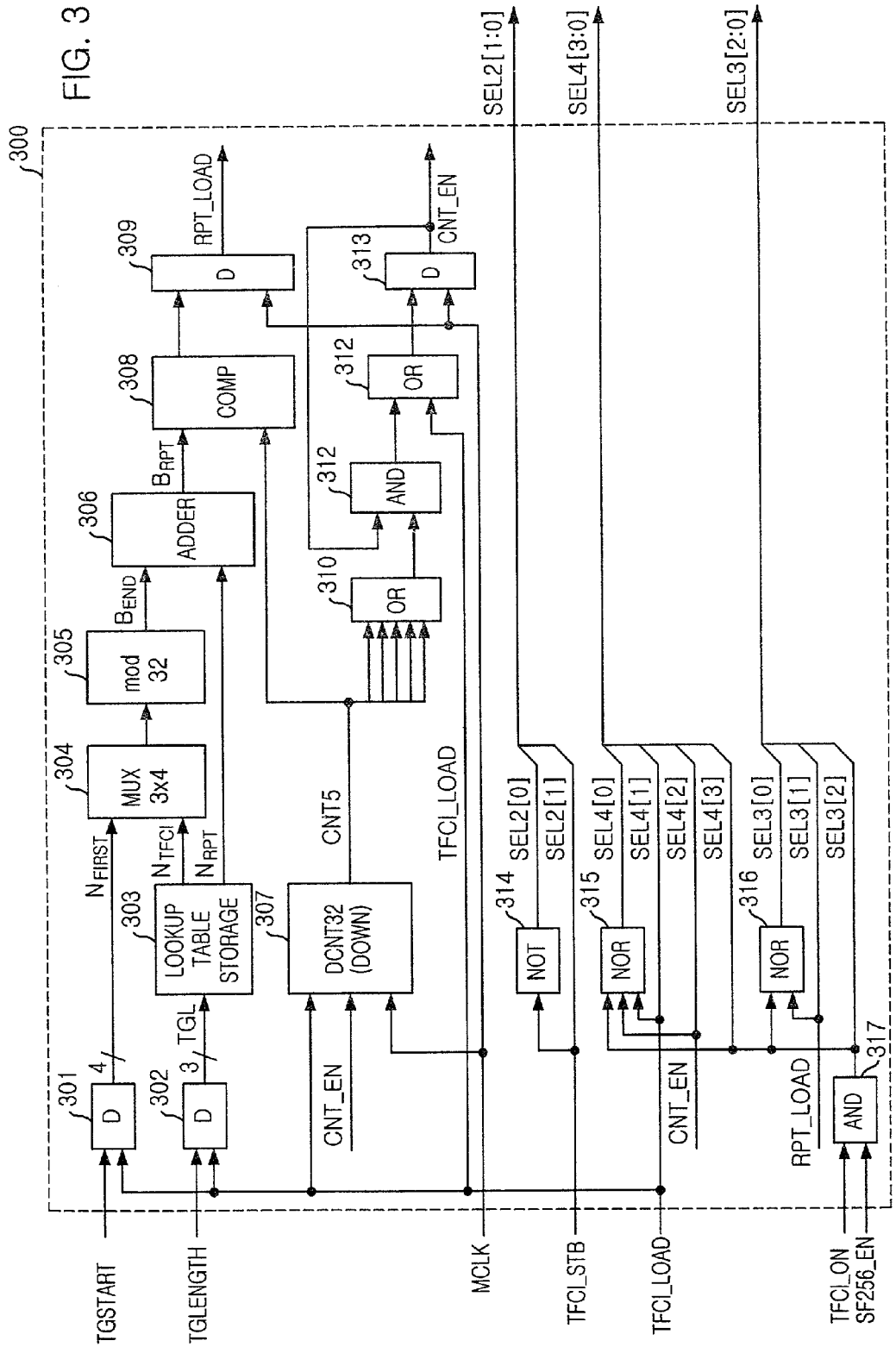
FIG. 3 is a detailed structure diagram for one embodiment of a mapper control block in an inventive TFCI mapping apparatus.

FIG. 3 is a detailed structure diagram for one embodiment of the mapper control block in the inventive TFCI mapping apparatus.

As shown in the drawing, the inventive mapper control block 300 includes a plurality of D flipflops 301, 302, 309, 313, a lookup table storage 303, a multiplier 304, an adder 306, a counter 307, a comparator 308 and numerous logic gates as NOT, NOR and AND gates.

In an input signal of the mapper control block 300, there are TGSTART 4 bit which represents the start slot value of the TG transmitted from the CPU 210, and TGLENGTH 3 bit which represents a length of the TG. Also, in order to receive 32 bit TFCI code values which are provided as the result of the reed muller encoder 250 in series there are a strobe signal (hereinafter, referred to as 'TFCI_STB') received from the reed muller encoder 250 and a signal (hereinafter, referred to as 'TFCI_LOAD') for informing of a start of a new frame received in a mobile station of an IMT-2000 asynchronous system not shown in the drawing, and there further are a signal (hereinafter, referred to as 'TFCI_ON') which becomes 1 in a TFCI transmission section within one slot, a transmission interval signal of TFCI (hereinafter, referred to as 'SF256_EN'), and a main clock signal (hereinafter, referred to as 'MCLK').

In addition, an output of the mapper control block 300 is SEL2[1:0], SEL4[3:0] and SEL3[2:0] as a control signal for a multiplexer of the mapping shift register block 400.

First, the D flipflop 301, 302 performs a function of updating TGSTART and TGLENGTH by the TFCI_LOAD signal every frame. The lookup table storage 303 receives TGL as the updated TGLENGTH, and generates parameter which is represented in [Table 1]. Thus, 3 bit of the updated TGLENGTH signal is inputted to the lookup table storage 303, and generates $N_{TFCI}$ as the TFCI number per slot and $N_{RPT}$ as the repetition number per frame.

The multiplier 304 (MUL3×4) multiplies $N_{FIRST}$ and $N_{TFCI}$ provided as a start slot number of the compressed mode, and the mod 32 (305) selects only lower 5 bit among output 7 bits to generate $B_{END}$. Further, the adder 306 adds up $B_{END}$ and $N_{RPT}$ to generate $B_{RPT}$.

The counter 307 (DCNT32) as the 5 bit down counter performs a counting operation by MCLK at a section where a counter enable signal (hereinafter, referred to as 'CNT_EN') is '1', and when TFCI_LOAD becomes 1, it is reduced from the next clock each by 1 in "11111". When a counting value becomes "00000", CNT_EN becomes '0' in the next clock and then the counting is stopped under the state that the counting value becomes "11111".

An output of the counter 307 (hereinafter, referred to as 'CNT5') is compared with the above generated $B_{RPT}$ value, and when the values are same, the D flipflop 309 generates the RPT_LOAD signal which is delayed by one clock more than CNT5.

The CNT_EN signal is delayed by one clock by the OR gate 312 and the D flipflop 313 when TFCI_LOAD becomes '1', and thus, the CNT_EN signal becomes '1'. Also, when the value of the counter 307 becomes "00000" under a state that TFCI_LOAD is '0' and CNT_EN is '1', the CNT_EN signal is delayed by one clock by D flipflop 313 through the OR gate 310, the AND gate 311 and the OR gate 312, and then becomes '0'.

SEL2[1] is generated by using the TFCI_STB signal, and SEL2[0] inverts the TFCI_STB signal by using the NOT gate 314 and generates it.

SEL4[1] is generated by using TFCI_LOAD, and SEL4[2] is generated by using CNT_EN. Further, SEL4[3] becomes '1' in case that all of TFCI_ON and SF256_EN are '1', and SEL4[0] becomes '1' in case that all of SEL4[1], SEL4[2] and SEL4[3] are '0'.

SEL3[1] is generated by using the RPT_LOAD signal, and SEL3[1] becomes '1' in case that all of TFCI_ON and SF256_EN are '1'. Also, SEL3[0] becomes '1' in case that all of SEL3[1] and SEL3[2] are '0'.

Figure 4:
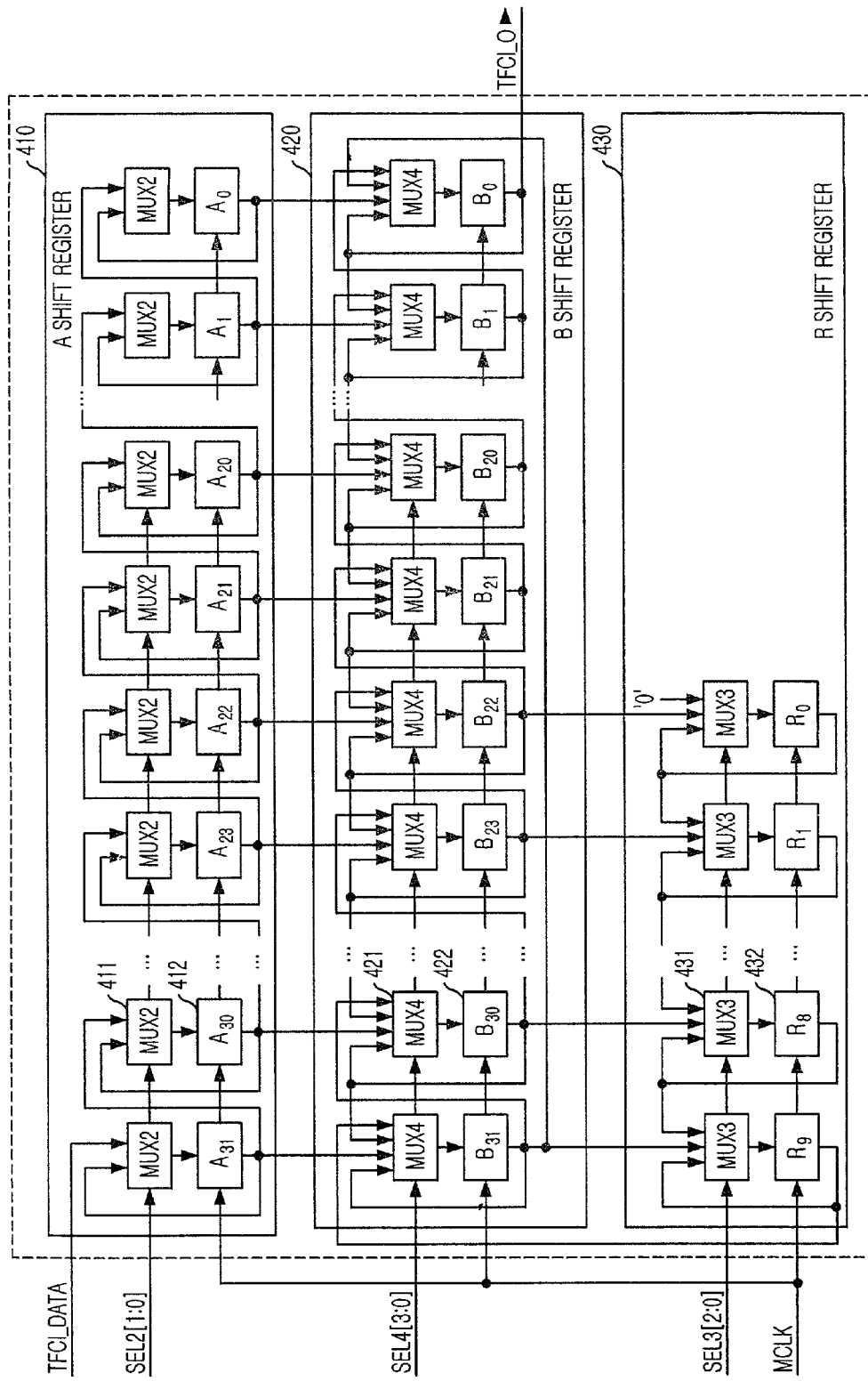
FIG. 4 is a detailed structure diagram for one embodiment of a mapping shift register in an inventive TFCI mapping apparatus.

FIG. 4 is a detailed structure diagram for one embodiment of the mapping shift register in the inventive TFCI mapping apparatus.

As shown in the drawing, the inventive mapping shift register 400 includes an A shift register 410, a B shift register 420 and an R shift register 430.

An input signal of the mapping shift register 400 is a serial value of 32 bit TFCI code (hereinafter, referred to as 'TFCI_DATA') inputted from the reed muller encoder 250, and SEL2[1:0], SEL4[3:0] and SEL3[2:0] generated in the mapper control block 300, and an output signal is a code value of TFCI (hereinafter, referred to as 'TFCI_O') in which the mapping is completed according that a puncture and a repetition are completed by the non compressed mode and the compressed mode complying with a TFCI transmission section provided within every slot.

As shown in the drawing, the A shift register 410 includes a 2×1 multiplexer 411 (hereinafter, referred to as 'MUX2') and 32 D flipflops 412 driven to MCLK.

TFCI_DATA inputted in series together with TFCI_STB is shifted to the right side by a selection of MUX2 having a control of SEL[1:0] in case that TFCI_STB is '1', and is stored, to thus generate 32 bit from $A_0$ to $A_{31}$.

As shown in the drawing, the B shift register 420 includes a 4×1 multiplexer 421 (hereinafter, referred to as 'MUX4') and 32 D flipflops 422 driven to MCLK. Further, the R shift register 430 includes a 3×1 multiplexer 431 (hereinafter, referred to as 'MUX3') and D flipflop 432 driven to MCLK.

In case the TFCI_LOAD signal as a start time point of a frame becomes 1, SEL4[1] becomes '1' to load $A_0$~$A_{31}$ values stored at the A shift register 410 to $B_0$~$B_{31}$. Also, within 32 clock sections from the next clock, SEL4[2] (namely, CNT_EN) value becomes '1', to thus perform 32 shift left rotations for $B_0$~$B_{31}$ value so as to be returned to an original itself value. When the RPT_LOAD signal becomes '1'in the midst of 32 shift left rotations, SEL[1] becomes '1', and at its time point, values of $B_{31}$, $B_{30}$, ..., $B_{22}$ in the B shift register 420 are respectively loaded to $R_9$, $R_8$, ..., $R_0$.

After that, the TFCI_ON signal becomes '1', and whenever the SF256_EN signal becomes '1', SEL4[3] and SEL3 [2] become '1', to thus output TFCI_O for the TFCI code value of the total 40 bit in an order of $B_0$, $B_1$, ..., $B_{30}$, $B_{31}$, $R_9$, $R_8$, ..., $R_0$, the TFCI code value being stored at the B shift register 420 and the R shift register 430.

Figure 5:
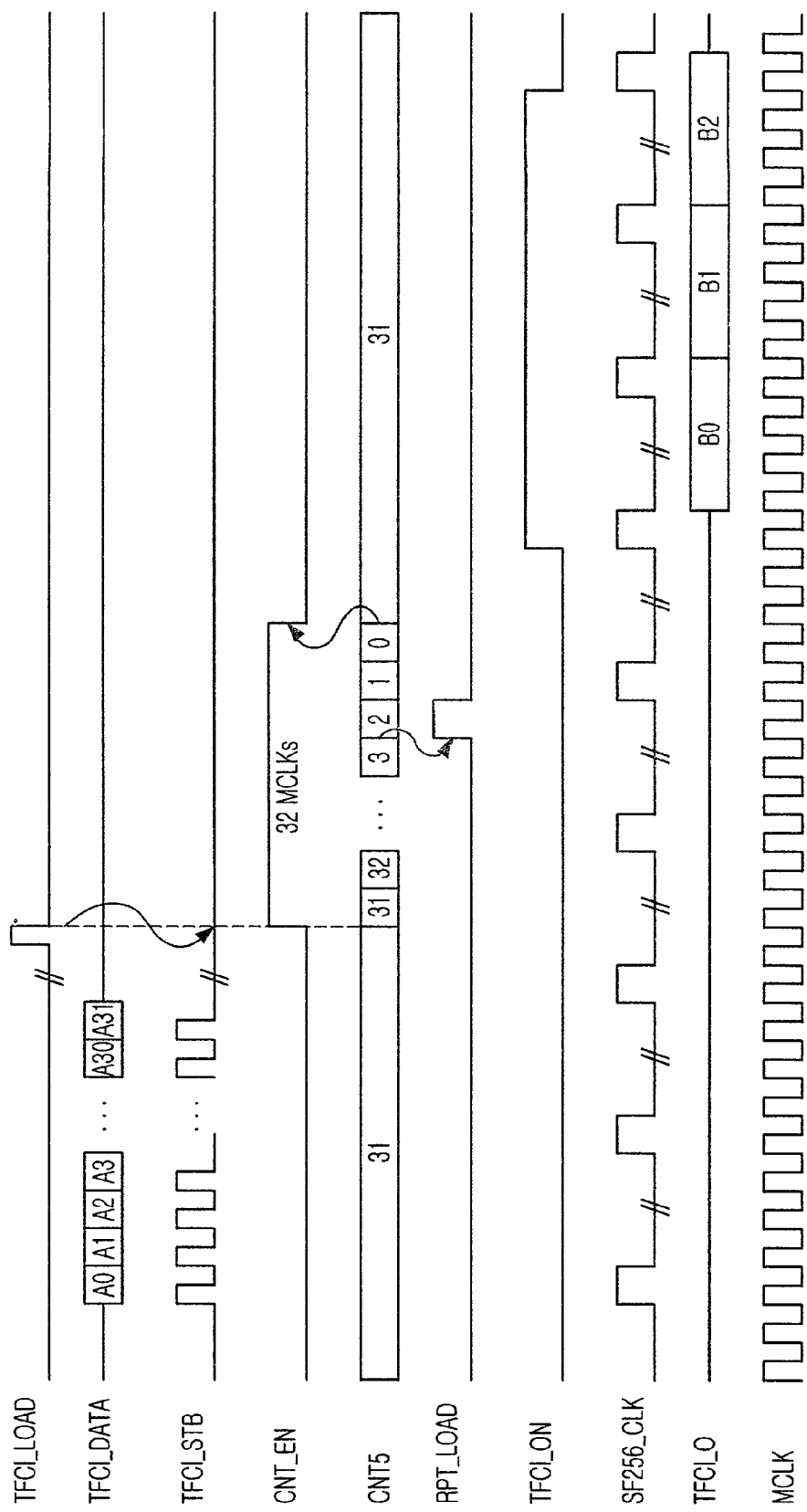
FIG. 5 illustrates a timing diagram for one embodiment of some signals in an inventive TFCI mapping apparatus.

FIG. 5 is a timing diagram for one embodiment of some signals in the inventive TFCI mapping apparatus.

As shown in the drawing, 1 bit TFCI_DATA synchronizes to TFCI_STB and the 32 number from $A_0$ to $A_{31}$ is inputted in series. When TFCI_LOAD signal becomes '1', CNT_EN becomes '1' in the next clock, and the counter 307 starts counting together with a reduction each by 1 from 31, and when already calculated $B_{RPT}$ value and CNT5 value become equal, the RPT_LOAD signal becomes '1' in the next clock. When the RPT_LOAD signal becomes '1', from $B_{31}$ to $B_{22}$ of the B shift register 420 at a corresponding time point is each loaded from $R_9$ to $R_0$ of the R shift register 430. Also, when the CNT5 value becomes "00000", CNT_EN becomes '0' and the counting is stopped. After that, when TFCI_ON becomes '1' and SF256_EN becomes '1', values of the B shift register 420 and the R shift register 430 are shifted by one bit each and are outputted to TFCI_O.

Figure 6:
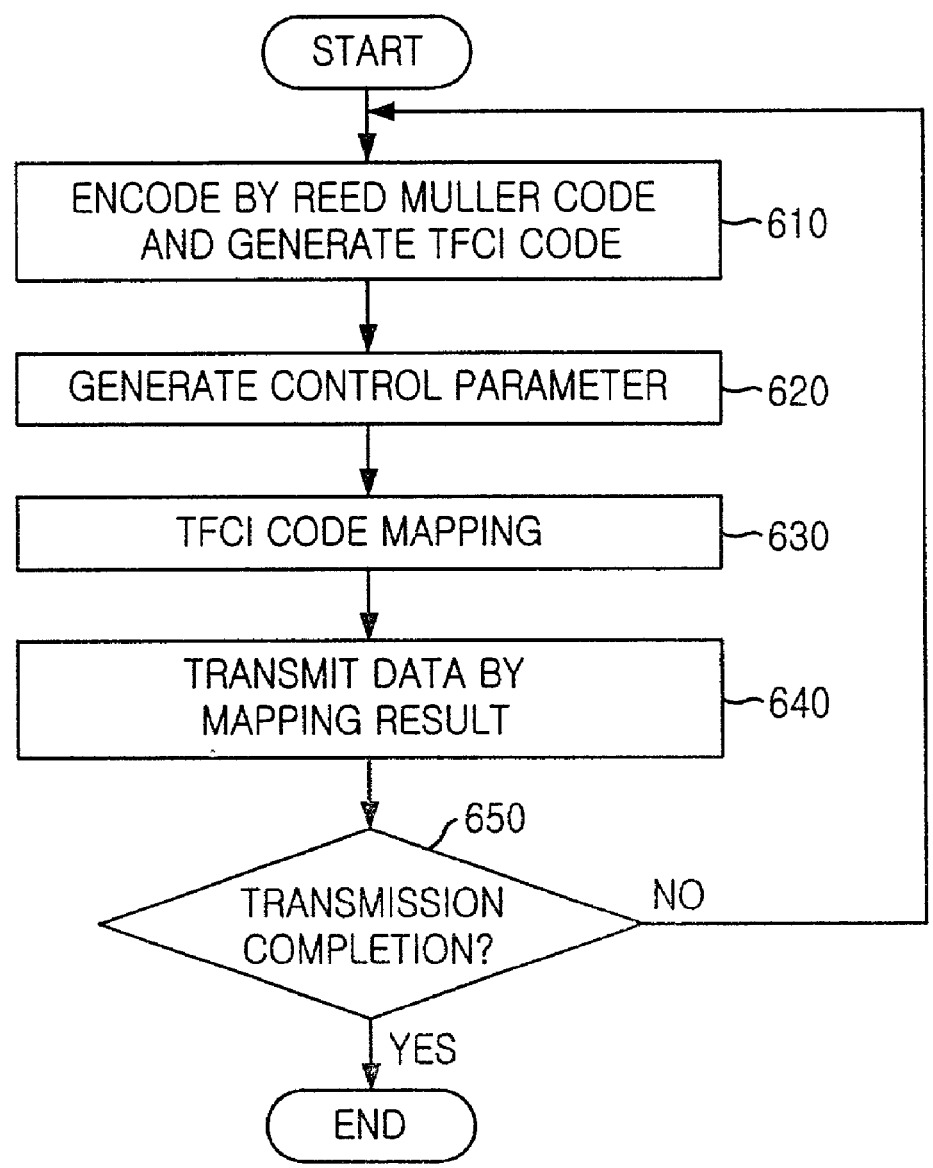
FIG. 6 shows a schematic flowchart for a TFCI mapping method in one embodiment of the present invention.

FIG. 6 is a schematic flowchart for the TFCI mapping method in one embodiment of the present invention.

As shown in the drawing, in the inventive TFCI mapping method, 10 bit TFCI transmitted every frame from the CPU 210 through the TFCI register 220 is encoded by the reed muller code, to thus generate 32 bit TFCI code in a step 610.

Further, necessary control parameter is generated by using input signals such as a TGSTART value, a TGLENGTH value and a frame boundary signal, a TFCI transmission section signal, and TFCI transmission frequency signal etc. in a step 620.

The TFCI code bit repetitive pattern is generated and an overall TFCI mapping is performed in a step 630.

Thus, the TFCI code value is transmitted according to the mapped bit result in a step 640.

Figure 7:
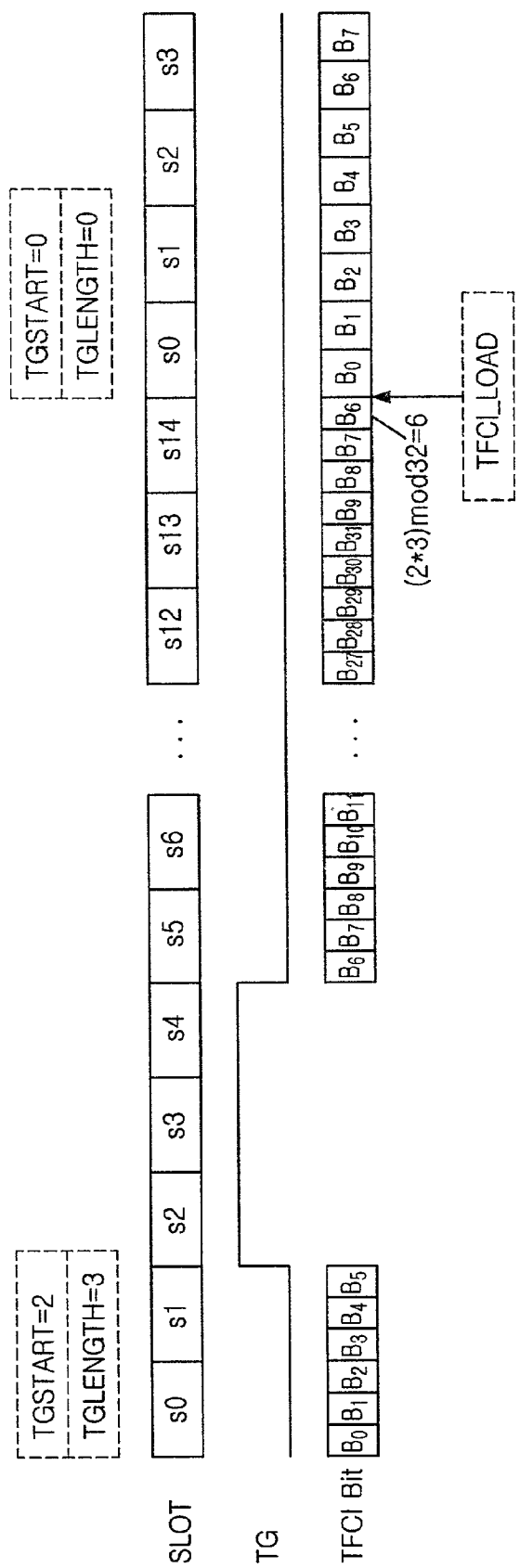
FIG. 7 is a concept diagram for one embodiment of a single frame method in an inventive TFCI mapping method.

FIG. 7 is a concept diagram for one embodiment of a single frame method in the inventive TFCI mapping method.

As shown in the drawing, the inventive single frame method is the embodied example which corresponds to a case that TGSTART is 2 and TGLENGTH is 3.

In case that TGLENGTH is 3, the lookup table storage 303 generates 3 and 4 for each of $N_{TFCI}$ and $N_{RPT}$.

In this case, the mapper control block 300 generates 6 for $B_{END}$ and 10 for $B_{RPT}$, RPT_LOAD is delayed by one clock, and becomes 1 when CNT5 is 9, and the final repetitive bit becomes $B_9$, $B_8$, $B_7$ and $B_6$.

Therefore, $B_0$, $B_1$, and $B_2$ are transmitted at the TFCI transmission section provided within a s0 section as the slot 0, and $B_3$, $B_4$ and $B_5$ are transmitted at an s1 section, and $B_6$, $B_7$ and $B_8$ are transmitted at an s5 section. Likewise, $B_{30}$, $B_{31}$ and $R_9(B_9)$ are transmitted at an s13, and $R_8(B_8)$, $R_7(B_7)$ and $R_6(B_6)$ are transmitted at an s14 section. Nothing is transmitted at s2, s3 and s4 as the TG section.

Figure 8:
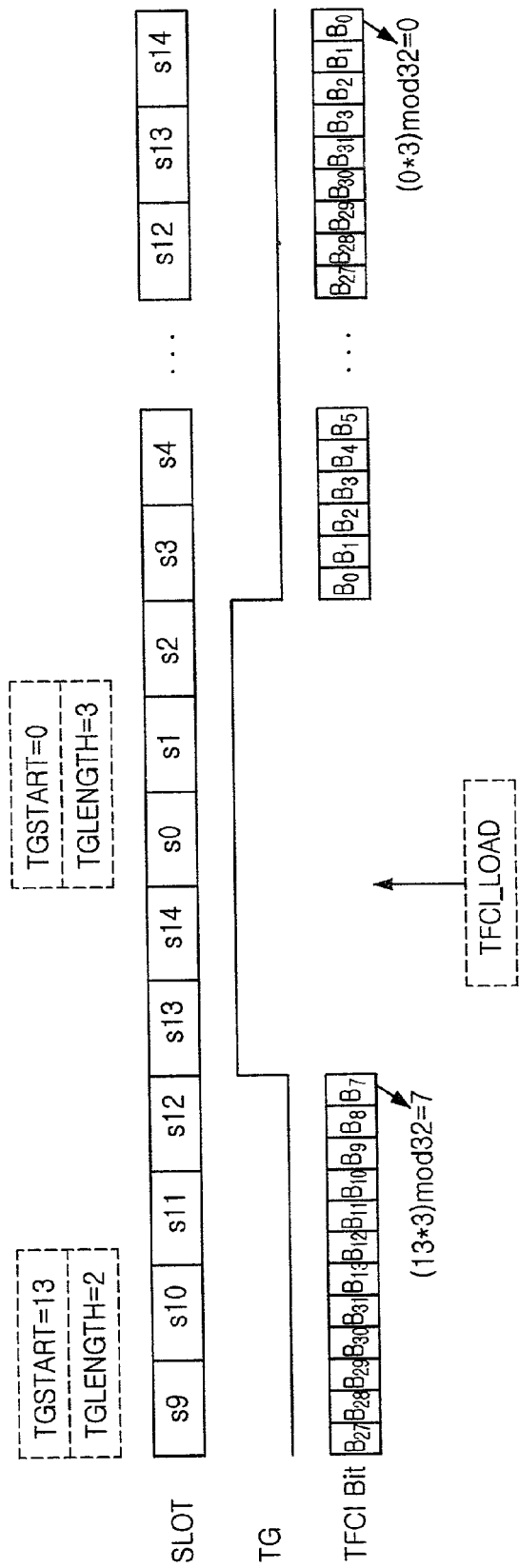
FIG. 8 is a concept diagram for one embodiment of a double frame method in an inventive TFCI mapping method.

FIG. 8 is a concept diagram for one embodiment of a double frame method in the inventive TFCI mapping method.

The double frame mode is processed by applying two single frame modes. In a first frame, it is for the case that TGSTART is 13 and TGLENGTH is 2. The lookup table storage 303 respectively generates 3 and 7 for each of $N_{TFCI}$ and $N_{RPT}$.

In this case, the mapper control block 300 generates 7 for $B_{END}$ and 14 for $B_{RPT}$, and RPT_LOAD becomes 1 when CNT5 is 13, thus, the final repetitive bit becomes $B_{13}$, $B_{12}$, $B_{11}$, $B_{10}$, $B_9$, $B_8$, and $B_7$.

Meantime, in a second frame it is for the case that TGSTART is 0 and TGLENGTH is 3, and the lookup table storage 303 respectively generates 3 and 4 for each of $N_{TFCI}$ and $N_{RPT}$.

In this case, the mapper control block 300 generates 0 for $B_{END}$ and 4 for $B_{RPT}$, and RPT_LOAD becomes 1 when CNT5 is 3, thus, the final repetitive bit becomes $B_3$, $B_2$, $B_1$, and $B_0$.

A method of the present invention above-described can be stored at a record medium such as a CDROM, a RAM, a ROM, a floppy disk, a hard disk, and an optical magnetic disk etc., the record medium being read through a computer which is embodied by a program.

As afore-mentioned, in accordance with the present invention, in order to construct a TFCI mapping algorithm complicated within a modulator of a mobile station by a simplified circuit in an IMT-2000 asynchronous system, it is utilized a mapper control block for generating a control signal, and a mapping shift register which is constructed with shift register blocks having the maximum utility for a nature of a shift register, to thereby minimize, to about 700 gates, the number of hardware gates which are embodied in all TFCI mappers.

What is claimed is:

1. An apparatus for a TFCI (Transport Format Combination Indicator) mapping in a wireless communication mobile station, comprising:
   an encoding unit for encoding a TFCI transmitted from a main control unit;
   a TFCI mapping unit for generating a necessary control parameter and a TFCI code by using a signal encoded by the encoding unit and a signal transmitted from the main control unit; and
   a CPU for controlling the encoding unit and the TFCI mapping unit,
   wherein the TFCI mapping unit includes:
      a mapper control block for receiving (a) a signal (TGSTART) indicating a start slot of a non transmission section TG, (b) a signal (TGLENGTH) indicating a length of TG from the CPU, (c) a strobe signal (TFCI STB) necessary for receiving a 32 bit TFCI code value from the encoding unit, (d) a signal (TFCI LOAD) indicating start of a new frame, (e) a signal (TFCI ON) which becomes 1 in a TFCI transmission section within one slot, (f) a transmission interval signal of the TFCI (SF256 EN) of the TFCI and (g) a main clock signal MCLK, from the wireless communication mobile station, wherein the mapper control block generates a first output signal SEL2[1:0], a second output signal SEL4[3:0]and a third output signal SEL3[2:0]; and
      a shift register blockin which the TFCI mapping is completed and for receiving control signals (SEL2 [1:0], SEL4[3:0] and SEL3[2:0]) from the mapper control block, receiving a serial value of the 32 bit TFCI code value (TFCI_DATA) from the encoding unit, receiving the main clock signal (MCLK) from the wireless communication mobile station, and generating a TFCI TFCI O code value.

2. The apparatus as recited in claim 1, wherein said mapper control block includes:
   a first D-flipflop for receiving the TGSTART and the TFCI_LOAD signals transmitted from the CPU;
   a second D-flipflop for receiving the TGLENGTH and the TFCI_LOAD signals transmitted from the CPU;
   a lookup table storage for generating the TFCI number per slot and the TFCI number repeated per frame for a signal received from the second D-flipflop;
   a multiplier for multiplying the signal received from the first D-flipflop by the TFCI number per slot received from the lookup table storage;
   a lower bit generator for selecting a lower bit for the signal received from the multiplier;
   an adder for adding up signals received from the lower bit generator and the lookup table;
   a counter for receiving the TFCI_LOAD and MCLK signals, and the signal returned from a fourth D-flipflop, and performing a down counting;
   a comparator for comparing signals received from the adder and the counter;
   a third D-flipflop for receiving the signal transmitted from the comparator and the MCLK signal;
   a first OR gate for receiving the signal of numerous bits transmitted from the counter;
   a first AND gate for receiving the signal transmitted from the first OR gate and the signal returned from a fourth D-flipflop;
   a second OR gate for receiving the signal transmitted from the first AND gate and the TFCI_LOAD signal;
   the fourth D-flipflop for receiving the signal transmitted from the second OR gate and the MCLK signal;
   a NOT gate for receiving the TFCI_STB signal;
   a first NOR gate for receiving the TFCI_LOAD signal and the signal transmitted from the fourth D-flipflop and the signal transmitted from a second AND gate;
   a second NOR gate for receiving the signal transmitted from the second AND gate and the signal transmitted from the third D-flipflop; and
   the second AND gate for receiving the TFCI_ON and the SF256_EN signals.

3. The apparatus as recited in claim 1, wherein said first output signal (SEL2[1:0]) is a bit stream which is based on a signal SEL2[0] transmitted from a NOT gate and a TFCI_STB(SEL2[1]) signal.

4. The apparatus as recited in claim 1, wherein said second output signal (SEL4[3:0]) is a bit stream which is based on a signal (SEL4[0]) transmitted from a first NOR gate, a TFCI_LOAD(SEL4[1]) signal, a signal (SEL4[2]) transmitted from a fourth D-flipflop and a signal (SEL4[3]) transmitted from a second AND gate.

5. The apparatus as recited in claim 1, wherein said third output signal (SEL3[2:0]) is a bit stream which is based on a signal (SEL3[0]) transmitted from a second NOR gate, a signal (SEL3[1]) transmitted from a third D-flipflop and a signal SEL3[2] transmitted from a second AND gate.

6. The apparatus as recited in claim 1, wherein said shift register block includes:
   a first shift register for receiving the first output signal (SEL2[1:0]) and the TFCI_DATA signal, and loading TFCI storage data to a second shift register;
   the second shift register for receiving the second output signal (SEL4[3:0]) and the MCLK signal, receiving data from the first shift register to perform a shift rotation and provide it as an output, and loading some data to a third shift register in the midst of performing the shift rotation in case that SEL3[1] among the third output signal is 1; and
   the third shift register for receiving the third output signal SEL3[2:0] and MCLK, and receiving the data from the second shift register, and outputting it.

7. A method for a TFCI (Transport Format Combination Indicator) mapping in a wireless communication mobile station, comprising the steps of:
   a) encoding a TFCI transmitted from a main control unit CPU to generate an encoded signal;
   b) generating control parameters by using the encoded signal, a signal transmitted from the CPU and a signal transmitted from a mobile station;
   c) generating a TFCI code bit repetitive pattern to generate a TFCI code; and
   d) transmitting data according to a mapped code,
   wherein the step b) includes:
      b1) receiving a signal (TGSTART) indicating a start slot of a non transmission section TG and a signal (TGLENGTH) indicating a length of TG from the CPU, for receiving a strobe signal (TFCI_STB) necessary for receiving a 32 bit TFCI code value from an encoding unit in series; and
      b2) generating a first output signal (SEL2[1:0]), a second output signal (SEL4[3:0]), a third output signal (SEL3[2:0]), a signal (TFCI_LOAD) for informing of a start of a new frame, a signal (TFCI_ON) which becomes 1 in a TFCI transmission section within one slot, a transmission interval signal of the TFCI (SF256_EN), and a main clock signal (MCLK), from the wireless communication mobile station,
   wherein the step c) includes:
      c1) receiving control signals (SEL2[1:0], SEL4[3:0] and SEL3[2:0]) from a mapper control block, receiving a serial value of the 32 bit TFCI code TFCI_DATA from the encoding unit, and receiving the main clock signal (MCLK) from the wireless communication mobile station; and
      c2) generating a TFCI TFCI_O code value.

8. A computer readable record medium storing of a program, in a TFCI (Transport Format Combination Indicator) mapping apparatus which has a microprocessor, for executing a method for a TFCI mapping in a wireless communication mobile station, the method comprising the steps of:
   a) encoding a TFCI transmitted from a main control unit CPU to generate an encoded signal;
   b) generating control parameters by using the encoded signal, a signal transmitted from the CPU and a signal transmitted from a mobile station;
   c) clarifying whether or not a TFCI transmission is a non-compressed mode, generating a TFCI code by puncturing data in a case of the non compressed mode, generating a TFCI code bit repetitive pattern in a case of a compressed mode to generate the TFCI code; and
   d) transmitting data according to a mapped code,
   wherein the step b) includes:
      b1) receiving a signal (TGSTART) indicating a start slot of a non transmission section TG and a signal (TGLENGTH) indicating a length of TG from the CPU, for receiving a strobe signal (TFCI_STB) necessary for receiving a 32 bit TFCI code value from an encoding unit in series; and b2) generating a first output signal (SEL2[1:0]), a second output signal (SEL4[3:0]), a third output signal (SEL3[2:0]), a signal (TFCI_LOAD) for informing of a start of a new frame, a signal (TFCI_ON) which becomes 1 in a TFCI transmission section within one slot, a transmission interval signal of the TFCI (SF256_EN), and a main clock signal (MCLK), from the wireless communication mobile station, wherein the step c) includes:

c1) receiving control signals (SEL2[1:0], SEL4[3:0] and SEL3[2:0]) from a mapper control block, receiving a serial value of the 32 bit TFCI code (TFCI_DATA) from the encoding unit, and receiving the main clock signal (MCLK) from the wireless communication mobile station; and c2) generating a TFCI TFCI_O code value.

\* \* \* \* \*